United States Patent [19]
Nance et al.

[11] Patent Number: 6,111,599
[45] Date of Patent: Aug. 29, 2000

[54] APPARATUS FOR OBSERVING A HOSTILE ENVIRONMENT

[75] Inventors: Thomas A. Nance, Aiken; Micah L. Boylston, Williston; Casandra W. Robinson, Trenton; William C. Sexton; Frank M. Heckendorn, both of Aiken, all of S.C.

[73] Assignee: Westinghouse Savannah River Company, Aiken, S.C.

[21] Appl. No.: 09/007,115

[22] Filed: Jan. 14, 1998

[51] Int. Cl.⁷ ...................................................... H04N 7/18
[52] U.S. Cl. .................................................. 348/82; 348/83
[58] Field of Search ..................... 348/61, 82, 83, 348/84, 85

[56] References Cited

U.S. PATENT DOCUMENTS

| | | | |
|---|---|---|---|
| 3,021,385 | 2/1962 | Summerhayes | 348/83 |
| 3,277,238 | 10/1966 | Sharp | 348/83 |
| 3,609,236 | 9/1971 | Heilman | 348/83 |
| 3,718,758 | 2/1973 | Ponghis et al. | 348/83 |
| 4,131,914 | 12/1978 | Bricmont | 348/83 |
| 4,837,615 | 6/1989 | Boshier | 348/82 |
| 4,840,474 | 6/1989 | Heft et al. | 348/83 |
| 5,139,412 | 8/1992 | Kychakoff | 348/83 |
| 5,155,358 | 10/1992 | Larson | 348/244 |
| 5,162,906 | 11/1992 | Yorita | 348/83 |
| 5,485,237 | 1/1996 | Adermann | 348/82 |
| 5,592,217 | 1/1997 | Hirvonen | 348/83 |
| 5,652,617 | 7/1997 | Barbour | 348/85 |
| 5,739,845 | 4/1998 | Hansford | 348/83 |
| 5,831,668 | 11/1998 | Hirvonen | 348/82 |
| 5,920,337 | 7/1999 | Glassman | 348/36 |

*Primary Examiner*—Bryan Tung
*Attorney, Agent, or Firm*—Hardaway/Mann IP Group Nexson Pruet Jacobs & Pollard, LLP

[57] ABSTRACT

An apparatus is provided for observing a hostile environment, comprising a housing and a camera capable of insertion within the housing. The housing is a double wall assembly with an inner and outer wall with an hermetically sealed chamber therebetween. A housing for an optical system used to observe a hostile environment is provided, comprising a transparent, double wall assembly. The double wall assembly has an inner wall and an outer wall with an hermetically sealed chamber therebetween. The double wall assembly has an opening and a void area in communication with the opening. The void area of the housing is adapted to accommodate the optical system within said void area. An apparatus for protecting an optical system used to observe a hostile environment is provided comprising a housing; a tube positioned within the housing; and a base for supporting the housing and the tube. The housing comprises a double wall assembly having an inner wall and an outerwall with an hermetically sealed chamber therebetween. The tube is adapted to house the optical system therein.

5 Claims, 3 Drawing Sheets

APPARATUS FOR OBSERVING A HOSTILE ENVIRONMENT

STATEMENT AS TO RIGHTS TO INVENTIONS MADE UNDER FEDERALLY SPONSORED RESEARCH AND DEVELOPMENT

The U.S. Government has rights in this invention pursuant to contract number DEAC09-89-SR18035 between the Department of Energy and Westinghouse Savannah River Company.

BACKGROUND OF THE INVENTION

The present invention is directed to an optical system. Specifically, the invention is directed to a housing for optical equipment used to survey the conditions in a hostile environment.

Hostile environments exhibit conditions that are detrimental to optical systems and their related housings. High temperatures, debris and smoke can quickly damage sensitive optical components. Despite these conditions, operators need to observe conditions inside the hostile environment. Several conventional optical systems exist for surveying hostile environments.

U.S. Pat. No. 3,021,385 to Summerhayes, Jr. et al. describes a flame observation system insertable into the wall of a combustion chamber. A housing stores a lens and a camera. The housing has a small aperture near the lens. Compressed air is provided to the housing. The air escapes through the aperture, both cooling the lens and preventing particles and smoke from contaminating the lens.

U.S. Pat. No. 5,139,412 to Kychakoff et al. describes an apparatus for profiling the bed of a furnace. A camera mounts to a proximal end of the lens tube assembly. The lens tube assembly is inserted into an air port of the furnace. Compressed air is provided to the tube assembly for cooling the lenses and sweeping debris from the open distal end of the tube assembly.

U.S. Pat. No. 5,155,358 to Larson describes a double wall housing for a camera used to survey a boiler. A baffle assembly is provided between the inner and outer walls. A thermoswitch operates at a given temperature to supply compressed air to the space between the inner and outer wall for cooling.

U.S. Pat. No. 5,162,906 to Yorita et al. describes an apparatus for observing the interior of a hot furnace. The camera case is jacketed for water cooling. Compressed air is supplied to the interior of the camera case for cooling. The air exits through a slit near the several glass plates. The glass plates allow selective wave-lengths to pass therethrough for viewing by the video camera.

U.S. Pat. No. 5,485,237 to Adermann et al. describes a protective camera housing and optical system used during blasting operations in underground mines. The case has a blast-proof inner and outer frame. The casing is inserted into the wall of a mine shaft. A small portion of the casing, housing the optical prism, projects into the mine shaft. The optical prism allows the camera to "look around corners" during blasting.

U.S. Pat. No. 5,592,217 to Hirvonen et al. describes an assembly for monitoring a combustion chamber. The support tube includes a hole at a distal end used as an aperture stop. The support tube also has an outer thermal shield, with a channel therebetween. Cooling air is provided to the support tube and the channel. The air exits through the hole at the distal end, preventing contaminants from damaging the lenses.

Hostile environments are not designed with an eye towards allowing effortless viewing of the contents therein. The placement of viewing ports in furnaces, ovens, etc. has a low design priority, often as an afterthought. The viewing ports must also be small in order to avoid heat loss from the hostile environment. For example, a viewing port could have an opening as small as approximately 2" in diameter. The viewing assembly must be able to operate within these limited spatial dimensions.

In addition, the viewing assembly must also be capable of deep insertion within the hostile environment. The desired viewing location within the hostile environment may not be adjacent the viewing port. This requires the observation equipment to traverse a distance within the hostile environment, subjecting the viewing assembly to even higher temperatures. Conventional assemblies do not exhibit any of these capabilities.

Furthermore, all of the conventional assemblies described herein require air and/or water cooling systems to prevent damage to the optical components. All of the conventional assemblies only provide one image of the hostile environment. The conventional assemblies that use a double wall arrangement provide for fluid movement between the inner and outer walls.

Clearly, there is room for improvement in the art.

SUMMARY OF THE INVENTION

Therefore, it is an object of the present invention to provide an apparatus for observing a hostile environment capable of sustained placement in the hostile environment.

It is a further object of the present invention to provide an apparatus that protects its optical systems from damage caused by exposure to the hostile environment.

It is a further object of the present invention to provide an apparatus that is capable of operation in hostile environments that have confined viewing entrances.

It is a further object of the present invention to provide an apparatus that allows placement within the hostile environment away from the viewing entrance.

It is a further object of at least one aspect of the present invention to provide an apparatus that maintains the optical systems at a suitable temperature without the need for air or water cooling.

It is a further object of the present invention to provide an apparatus that maintains a physical barrier between the optical systems and the hostile environment.

It is a further object of the present invention to provide an apparatus that allows the optical system to view through the apparatus walls.

It is a further object of at least one aspect of the present invention to provide an apparatus that allows simultaneous viewing of the hostile environment in more than one direction.

It is a further object of at least one aspect of the present invention to provide an apparatus that allows adjustable viewing of the hostile environment in at least one direction.

These and other objects are achieved in one aspect of the present invention by an apparatus for observing a hostile environment comprising a housing and a camera capable of insertion within the housing. The housing is a double wall assembly with an inner and outer wall with an hermetically sealed chamber therebetween. Preferably, the chamber is evacuated to a hard vacuum.

These and other objects are achieved in another aspect of the present invention by a housing for an optical system used to observe a hostile environment comprising a transparent, double wall assembly. The double wall assembly has an inner wall and an outer wall with an hermetically sealed chamber therebetween. The double wall assembly has an opening and a void area in communication with the opening. The void area of the housing is adapted to accommodate the optical system within said void area. Preferably, the chamber is evacuated to a hard vacuum.

These and other objects are achieved in another aspect of the present invention by an apparatus for protecting an optical system used to observe a hostile environment comprising a housing; a tube positioned within the housing; and a base for supporting the housing and the tube. The housing comprises a double wall assembly having an inner wall and an outer wall with an hermetically sealed chamber therebetween. The tube is adapted to house the optical system therein. Preferably, the chamber is evacuated to a hard vacuum.

BRIEF DESCRIPTION OF THE DRAWINGS

The features of the present invention will become apparent to those skilled in the art to which the present invention relates from reading the following specification with reference to the accompanying drawings in which.

DETAILED DESCRIPTION

Figure 1:
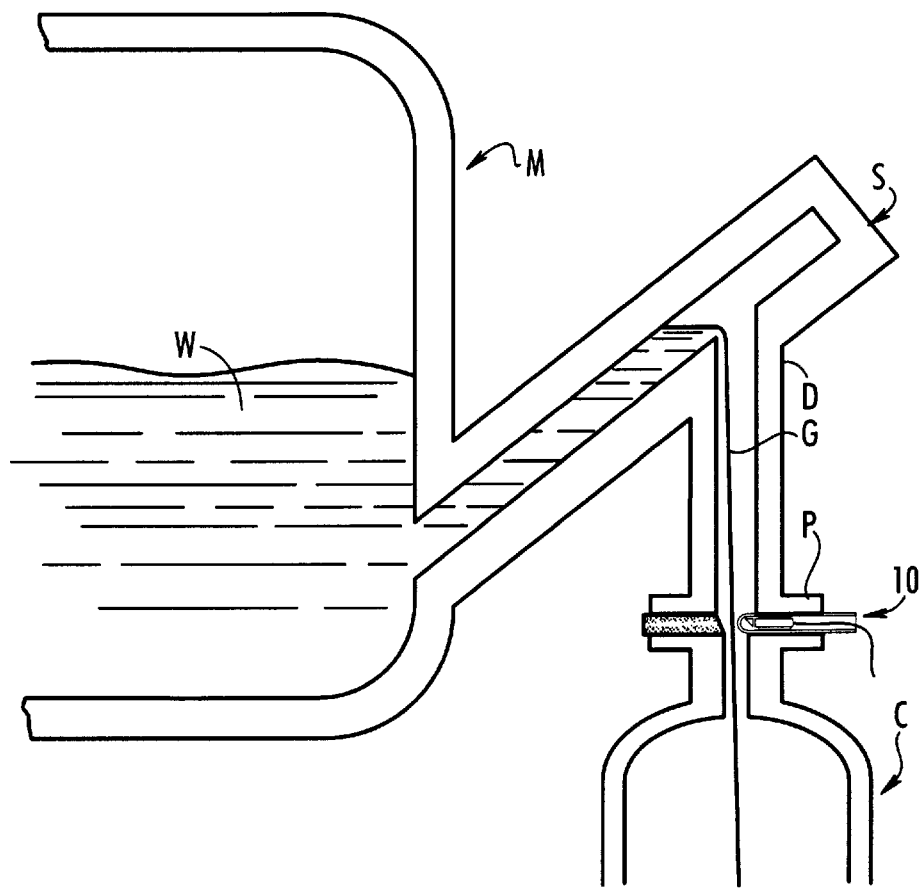
FIG. 1 is a cross-sectional view of a hostile environment with a first embodiment of the present invention inserted therein.

Both embodiments of the present invention are capable of use in a Defense Waste Processing Facility (DWPF). FIG. 1 demonstrates the first embodiment of the present invention in use at a DWPF. However, Applicants recognize that the present invention can be used in any hostile environment. Other types of hostile environments include, for example, blast furnaces and coke ovens. The relatively high temperatures, debris and smoke in the hostile environment can damage optical systems. A special assembly is required to protect optical systems while surveying the hostile environment.

The DWPF operates as follows. A melter M heats waste W into a molten glass G. Molten glass G has a temperature range of between approximately 900° C. and 1100° C. Molten glass G travels from melter M into pour spout S. Molten glass G enters downspout D and reaches a storage canister C. A throat protector P protects the upper portion of storage canister C during the pouring of molten glass G.

Molten glass G can experience pouring difficulties during this process. The pouring difficulties can occur at several locations including pour spout S and downspout D. An operator must ascertain the location of the processing problem in order to determine a solution. In the other hostile environments described above, an optical system, for example, could be used to observe the interior of a furnace for damage or to profile the bed of a smelting furnace. The first embodiment of the present invention can be used at numerous locations in the DWPF. The second embodiment, which is capable of withstanding higher temperatures than the first embodiment, can be used at all locations in the DWPF.

In the DWPF, pour spout S and downspout D are relatively narrow. This requires an optical system to be placed relatively close to the molten glass stream G. Clearly, a special assembly is required to withstand such a harsh environment.

Figure 2:
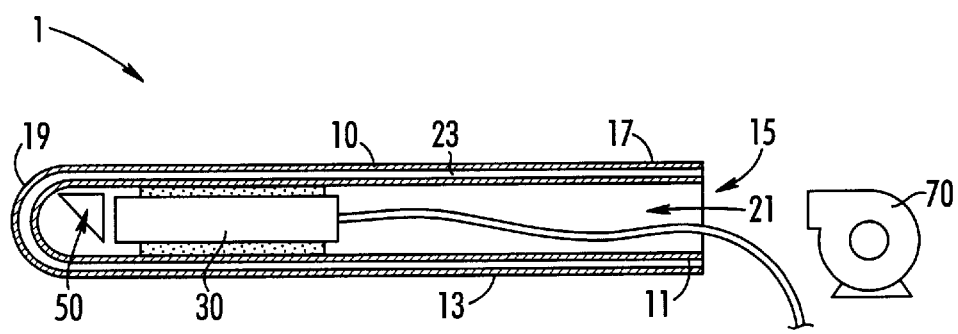
FIG. 2 is a cross-sectional view of the first embodiment of the present invention.

A first embodiment of the present invention will now be described with reference to FIGS. 1 and 2. FIG. 1 shows a viewing apparatus 1 inserted into throat protector P. Viewing apparatus 1 is inserted into the downspout D approximately 1.5" to 2" from the molten glass stream G. At such a position, viewing apparatus 1 could be subjected to temperatures of approximately 500° C.

Viewing apparatus 1 includes a housing 10 which can accommodate therein a camera 30 and a viewing prism 50. A reflective mirror (not shown) could also be used in place of viewing prism 50. FIG. 2 shows a cross sectional view of housing 10. Housing 10 is transparent, preferably made from clear quartz. In the preferred embodiment, housing 10 is shaped like a test tube.

Viewing prism 50 is, preferably, a right angle viewing prism. A right angle viewing prism allows camera 30 to view along downspout D even though the camera is mounted in throat protector P (i.e. perpendicular to the molten glass stream G). Camera 30 is, preferably, an industrial duty color video camera. For example, camera 30 could be Sony model number XC-777 color video camera. Specific structural details of prism 50 and camera 30 are known and are not required for an understanding of this invention. A discussion of housing 10 follows.

Housing 10 is a double wall vacuum bottle. The double wall assembly includes inner wall 11 and outer wall 13. Housing 10 has an opening 15 at a proximal end 17. Inside housing 10 is a void area 21. Void area 21 accommodates viewing prism 50 and camera 30. An hermetically sealed chamber 23 is formed between inner wall 11 and outer wall 13. Chamber 23 is preferably evacuated to a hard vacuum during manufacture of housing 10 using known manufacturing techniques.

Prior to insertion into the hostile environment, viewing prism 50 is secured within viewing assembly 1. Preferably, viewing prism is secured to the camera assemly at the distal end 19 of housing 10. Viewing prism 50 may be secured to camera 30 using known techniques. For example, stainless steel straps (shown in phantom in FIG. 2) and epoxy can secure viewing prism 50 to camera 30. Camera 30 is then secured in void area 21 of housing 10. Camera 30 may also be secured to housing 10 using known techniques. For example, the exterior of camera 30 can be wrapped in high temperature woven tape, then inserted into housing 10 (see FIG. 2). The specific method of securing viewing prism 50 and/or the camera 30 to housing 10 is not significant to the present invention.

Viewing assembly 1 is inserted into throat protector P. Distal end 19 of housing 10 is inserted approximately 1.5" to 2" away from the molten glass stream G. Right angle viewing prism 50 allows camera 30 to look up at the descending molten glass stream G. Camera 30 preferably remains positioned perpendicular to the molten glass stream G.

Since housing 10 is transparent, camera 30 views molten glass stream G through walls 11,13 of housing 10. Walls 11,13 form a physical barrier between the optical systems and the hostile environment. The physical barrier protects the optical systems from damage caused by the hostile environment.

An important feature of the present invention is that housing 10 lacks either an air and/or a water cooling system.

The double wall vacuum bottle arrangement of housing 10 maintains a suitable temperature despite being placed within 1.5" to 2" from the molten glass stream G in throat portion P.

If, however, viewing assembly 1 remains within throat protector P for an extended period of time or viewing assembly 1 must be positioned closer to molten glass stream G, then a cooling system should be used. For instance, a blower 70 could circulate air within void area 21. Blower 70 would be placed near opening 15 of proximal end 17. Blower 70 could, for example, be electrically powered.

Figure 3:
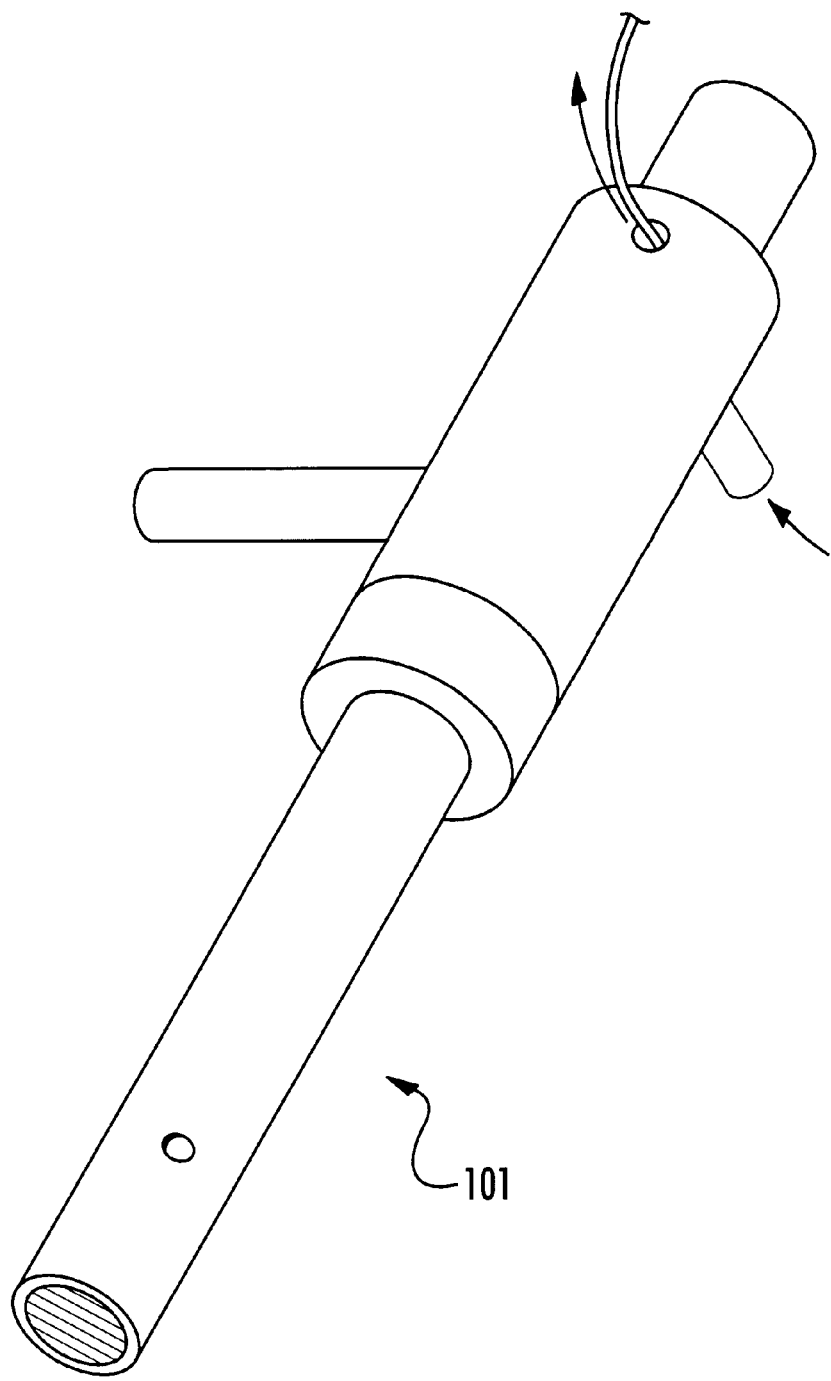
FIG. 3 is a perspective view of a second embodiment of the present invention.
Figure 4:
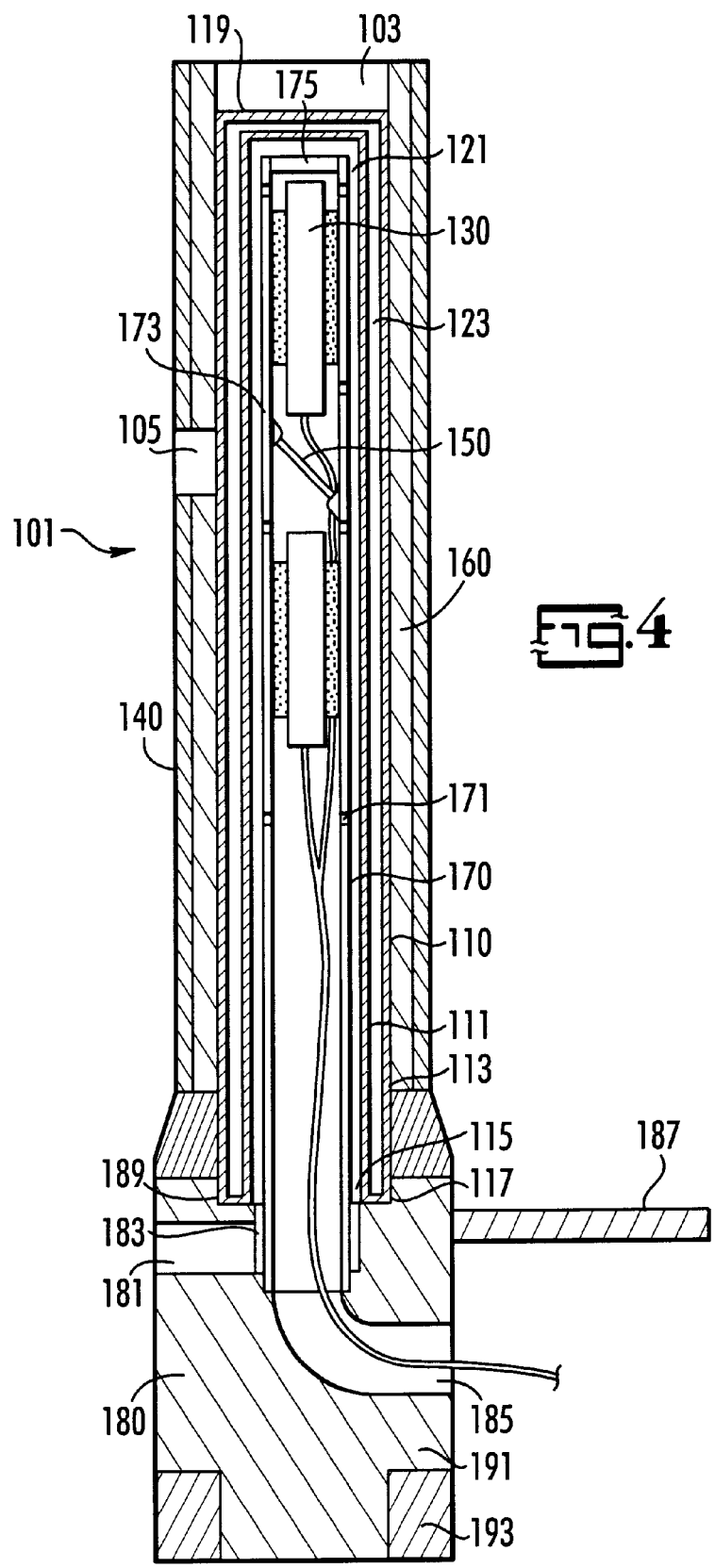
FIG. 4 is a cross-sectional view of the second embodiment of the present invention.

If the pouring difficulty is possibly in pour spout S or conditions in downspout D warrant, then a second embodiment of the present invention could be used that is capable of withstanding higher temperatures than the first embodiment. Positioned within pour spout, a viewing apparatus 101 could be subjected to temperatures of greater than approximately 1100° C. The second embodiment of the present invention will now be described with reference to FIGS. 3 and 4.

Viewing apparatus 101 has several components in common with the first embodiment, viewing apparatus 1. However, viewing apparatus 101 includes components that are not present on viewing apparatus 1. The additional components provide additional protection from thermal damage to cameras 130 and mirror 150.

Briefly described, viewing apparatus 101 includes a perforated tube 170 that houses cameras 130 and mirror 150. Tube 170 is positioned within housing 110. Both tube 170 and housing 110 seat within a manifold base 180. Shielding 140 and an insulation layer 160 surround housing 110. Cooling air is introduced into manifold 180, which then enters housing 110 and tube 170. Cameras 130 and a right angle viewing prism, or mirror 150, within viewing assembly 101 provide images from both an axial and a radial direction. Viewing assembly 101 can be rotated using handle 187 to allow complete 360° viewing in the radial direction. Each of the several elements will be described individually and in greater detail below.

Housing 110 is a double wall vacuum bottle. The double wall assembly includes inner wall 111 and outer wall 113. An hermetically sealed chamber 123 is formed between inner wall 111 and outer wall 113. Chamber 123 is, preferably, evacuated to a hard vacuum during manufacture of housing 110 using known techniques. Housing 110 has an opening 115 at a proximal end 117. A void area 121 exists inside housing 110 that is in communication with opening 115. Void area 121 accommodates tube 170 which houses the cameras 130 and mirror 150. Distal end 119 is substantially flat to allow camera 130 within perforated tube 170 to view the hostile environment axially from distal end 119 without distortion.

Perforated tube 170 is insertable within void area 121 of housing 110. Perforated tube 170 can house at least one camera 130 and a mirror 150. Tube 170 includes at least one aperture 171 for cooling and an aperture 173 for mirror 150. Mirror 150 is positioned within tube 170 to allow camera 130 to view a radial direction. In other words, camera 130 can view through the wall of tube 170. The other apertures 171 can be strategically positioned to ensure adequate thermal protection to cameras 130 and mirror 150. Distal end of tube 170 has a filter 175 secured thereto. Filter 175 is preferably the combination of a neutral density filter and a cyan filter. The neutral density filter reduces the amount of general light exposed to camera 130. The cyan filter reduces the amount of red light exposed to camera 130.

Cameras 130 are axially arranged within tube 170. Mirror 150 is positioned in front of one of cameras 130. With this arrangement, one camera 130 can view in the axial direction while the other camera 130 can view in the radial direction. Cameras 130 and mirrors 150 can be secured to tube 170 using known techniques, including epoxy or stainless steel straps.

Insulation layer 160 surrounds housing 110. Insulation layer 160 is preferably made from Nextel 312, a woven insulating material. Any other type of insulation that is capable of meeting the temperature requirements of viewing apparatus 101 could also be used. Insulation 160 reduces the amount of conductive and convective heat transfer to viewing assembly 101.

Shielding 140 surrounds insulation 160. Shielding 140 is preferably a reflective metal shielding such as stainless steel. Any other type of shielding material, such as carbon steel, that is capable of meeting the temperature requirements of viewing apparatus 101 could also be used. Shielding 140 reduces the amount of radiative heat transfer to viewing assembly 101.

Shielding 140 and insulation 160 do not completely envelop housing 110. Shielding 140 and insulation 160 provide an axial viewing port 103 on a distal end of viewing assembly 101 and a radial viewing port 105 on a side of viewing assembly 101. Cameras 130 and mirror 150 are positioned within tube 170 to utilize the axial viewing portion 103 and the radial viewing port 105.

Manifold base 180 secures all of the several components together. Base 180 is also used to provide cooling air to housing 110 and tube 170. Base 180 is preferably cooled since axial viewing port 103 and radial viewing port 105 are uninsulated and allow heat to build up within viewing assembly 101.

Base 180 includes fluidically connected inlet aperture 181, outlet aperture 185 and chamber 183. Cooling air enters manifold 180 through inlet 181. The cooling air then enters chamber 183 for distribution into housing 110 and tube 170 and for return to chamber 183. The cooling air then finally exits manifold 180 through outlet 185.

Chamber 183 distributes cooling air into housing 110 since only housing 110 is fluidically connected to chamber 183. Housing 110 seats within chamber 183 by resting on a shoulder 189 above distal end of tube 170. Tube 170 travels through chamber 183, but is only fluidically connected to outlet 185. Tube 170 seats within base 180 by being press-fit within outlet 185.

In such an arrangement, cooling air enters chamber 183 through inlet 181. The air travels into housing 110, passes through apertures 171,173 and enters tube 170. The air travels down tube 170 and enters outlet 185. The cooling air transfers the heat that viewing assembly 101 has absorbed from the hostile environment. By removing the excess heat, the cooling air allows viewing assembly 101 to remain within the hostile environment for extended durations and allows viewing assembly 101 to enter farther into the hostile environment.

An end 191 of base 180 that is opposite the end having inlet 181, chamber 183 and outlet 185 can include a bearing assembly 193 to allow rotation of viewing assembly 101. In order to rotate viewing assembly 101 relative to bearing assembly 193, a handle 187 secured to base 180 is rotated. Bearing assembly 193 can be any of the known conventional bearing assemblies. Rotating viewing assembly 1 allows a complete 360° view of the hostile environment in the radial direction.

Since hostile environments can include situations harmful to human operators, the viewing assemblies are capable of being operated remotely using, for example, a robotic platform. For instance, viewing assembly 101 can secure to the robot (not shown) using bearing assembly 193. A robotic arm (not shown) manipulates handle 187 to rotate viewing assembly 101.

The above description is given in reference to housings for optical systems used to observe hostile environments. However, it is understood that many variations are apparent to one of ordinary skill in the art from a reading of the above specification and such variations are within the spirit and scope of the instant invention as defined by the following appended claims.

We claim:

1. An apparatus for observing a hostile environment, comprising:

a housing comprising:

a double wall assembly having an inner wall forming a void area and an outer wall; and an hermetically sealed chamber between said inner wall and said outer wall; and at least one camera insertable within said housing, wherein said housing is entirely transparent.

2. A housing for an optical system used to observe a hostile environment, comprising:

an entirely transparent, double wall assembly having an inner wall and an outer wall;

an hermetically sealed chamber between said inner wall and said outer wall;

an opening; and a void area in communication with said opening;

wherein said housing is adapted to accommodate the optical system within said void area.

3. The housing for an optical system as recited in claim 2, wherein said wall assembly is formed from clear quartz.

4. The housing for an optical system as recited in claim 2, wherein said chamber is a vacuum chamber.

5. The housing for an optical system as recited in claim 2, wherein said wall assembly is test tube-shaped.

* * * * *